United States Patent
Schwandt et al.

(10) Patent No.: US 10,974,182 B2
(45) Date of Patent: Apr. 13, 2021

(54) HIGH SPEED ROTATING CRANKCASE VENTILATION FILTER MEDIA AND MEDIA PACK

(71) Applicant: Cummins Filtration IP, Inc., Columbus, IN (US)

(72) Inventors: Brian W. Schwandt, Fort Atkinson, WI (US); Saru Dawar, McFarland, WI (US); Christopher E. Holm, Madison, WI (US); Jerald J. Moy, Oregon, WI (US); Barry M. Verdegan, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 495 days.

(21) Appl. No.: 15/746,973

(22) PCT Filed: Aug. 19, 2016

(86) PCT No.: PCT/US2016/047755
§ 371 (c)(1),
(2) Date: Jan. 23, 2018

(87) PCT Pub. No.: WO2017/034976
PCT Pub. Date: Mar. 2, 2017

(65) Prior Publication Data
US 2018/0353882 A1    Dec. 13, 2018

Related U.S. Application Data

(60) Provisional application No. 62/208,284, filed on Aug. 21, 2015.

(51) Int. Cl.
*B01D 53/22* (2006.01)
*B01D 39/16* (2006.01)
(Continued)

(52) U.S. Cl.
CPC ............ *B01D 39/1623* (2013.01); *B32B 1/08* (2013.01); *B32B 5/022* (2013.01); *B32B 5/145* (2013.01);
(Continued)

(58) Field of Classification Search
CPC ............ B32B 5/145; B32B 2262/0263; B32B 2262/0276; B32B 2260/021;
(Continued)

(56) References Cited

U.S. PATENT DOCUMENTS 2,788,125 A * 4/1957 Webb ..................... B01D 35/05
                                                                  210/172.4
2,905,327 A * 9/1959 Phillips ................ B01D 35/027
                                                                  210/463
(Continued)

FOREIGN PATENT DOCUMENTS

| CN | 101491793 A | 7/2009 |
| CN | 101784325 A | 7/2010 |

(Continued)

OTHER PUBLICATIONS

Holdich, R.G., "Fundamentals of Particle Technology," Chapter 8, Midland Information Technology and Publishing, Jan. 1, 2002, 15 pages.

(Continued)

*Primary Examiner* — Anthony R Shumate
(74) *Attorney, Agent, or Firm* — Foley & Lardner LLP

(57) ABSTRACT

Filter media and media packs that provide robust performance in high-speed rotating coalescer (HSRC) elements for crankcase ventilation systems are described. The filter media is HSRC filter media. As such, the filter media has a higher resistance to compressibility than traditional coalescer filter (Continued)

media, such as filter media used in low-speed rotating coalescer arrangements or stationary coalescer arrangements.

44 Claims, 8 Drawing Sheets

(51) Int. Cl.
| | |
|---|---|
| D04H 1/46 | (2012.01) |
| D04H 1/4326 | (2012.01) |
| B32B 5/02 | (2006.01) |
| B32B 5/14 | (2006.01) |
| B32B 7/12 | (2006.01) |
| B32B 1/08 | (2006.01) |
| F02M 35/024 | (2006.01) |

(52) U.S. Cl.
CPC .............. *B32B 7/12* (2013.01); *D04H 1/4326* (2013.01); *D04H 1/46* (2013.01); *F02M 35/024* (2013.01); *B01D 2239/1233* (2013.01); *B32B 2250/40* (2013.01); *B32B 2260/021* (2013.01); *B32B 2260/046* (2013.01); *B32B 2262/0253* (2013.01); *B32B 2262/0276* (2013.01); *B32B 2262/101* (2013.01); *B32B 2307/724* (2013.01)

(58) Field of Classification Search
CPC ........ B32B 2260/046; B32B 2262/101; B32B 5/022; B32B 2250/40; B32B 1/08; B32B 2307/724; B32B 7/12; F02M 35/024; B01D 39/1623; B01D 2239/1233; D04H 1/4326; D04H 1/46
See application file for complete search history.

(56) References Cited

U.S. PATENT DOCUMENTS

| | | | |
|---|---|---|---|
| 2,937,755 A * | 5/1960 | Szwargulski | B01D 39/083 210/172.3 |
| 3,234,716 A | 2/1966 | Sevin et al. | |
| 3,362,155 A | 1/1968 | Driscoll | |
| 3,451,551 A * | 6/1969 | Downey | B01D 35/143 210/90 |
| 3,531,897 A | 10/1970 | Weimar | |
| 4,189,310 A | 2/1980 | Hotta | |
| 4,279,630 A * | 7/1981 | Nakamura | B01D 46/2411 123/518 |
| 4,482,365 A | 11/1984 | Roach | |
| 4,487,618 A | 12/1984 | Mann | |
| 4,502,956 A * | 3/1985 | Wilson | B01D 17/0208 210/248 |
| 4,514,193 A | 4/1985 | Booth | |
| 4,516,994 A | 5/1985 | Kocher | |
| 4,981,502 A | 1/1991 | Gottschalk | |
| 5,056,935 A | 10/1991 | Singh | |
| 5,401,706 A | 3/1995 | Fischer | |
| 5,462,658 A * | 10/1995 | Sem | B01D 27/08 210/172.1 |
| 5,466,385 A | 11/1995 | Rogers et al. | |
| 5,716,423 A | 2/1998 | Krul et al. | |
| 5,863,317 A | 1/1999 | Smith et al. | |
| 6,033,450 A | 3/2000 | Krul et al. | |
| 6,123,061 A | 9/2000 | Baker et al. | |
| 6,139,595 A | 10/2000 | Herman et al. | |
| 6,183,407 B1 | 2/2001 | Hallgren et al. | |
| 6,499,285 B1 | 12/2002 | Snyder | |
| 6,517,612 B1 | 2/2003 | Crouch et al. | |
| 6,640,792 B2 | 11/2003 | Harvey et al. | |
| 6,652,439 B2 | 11/2003 | Herman et al. | |
| 6,709,477 B1 | 3/2004 | Haakansson et al. | |
| 6,876,760 B1 * | 4/2005 | Vaisberg | G06K 9/0014 382/129 |
| 7,235,177 B2 | 6/2007 | Herman et al. | |
| 7,811,347 B2 | 10/2010 | Carlsson et al. | |
| 7,824,458 B2 | 11/2010 | Borgstrom et al. | |
| 7,824,459 B2 | 11/2010 | Borgstrom et al. | |
| 8,172,917 B2 | 5/2012 | Kup et al. | |
| 8,231,752 B2 * | 7/2012 | Janikowski | D01D 7/00 156/167 |
| 8,268,033 B2 | 9/2012 | Rogers et al. | |
| 8,794,222 B2 | 8/2014 | Schwandt et al. | |
| 8,974,567 B2 | 3/2015 | Verdegan et al. | |
| 2003/0034016 A1 | 2/2003 | Harvey et al. | |
| 2004/0016345 A1 * | 1/2004 | Springett | A41D 13/1146 96/66 |
| 2004/0020839 A1 * | 2/2004 | Kato | B01D 35/027 210/232 |
| 2004/0071328 A1 * | 4/2004 | Vaisberg | G01N 15/1475 382/129 |
| 2004/0214710 A1 | 10/2004 | Herman et al. | |
| 2006/0096263 A1 | 5/2006 | Kahlbaugh et al. | |
| 2006/0242933 A1 | 11/2006 | Webb et al. | |
| 2007/0039300 A1 * | 2/2007 | Kahlbaugh | B01D 39/2024 55/527 |
| 2007/0175191 A1 | 8/2007 | Ziebold et al. | |
| 2007/0249479 A1 | 10/2007 | Eliasson et al. | |
| 2007/0271884 A1 | 11/2007 | Pearson et al. | |
| 2008/0280777 A1 * | 11/2008 | Bittner | G16B 5/00 506/9 |
| 2009/0000258 A1 | 1/2009 | Carlsson et al. | |
| 2009/0020486 A1 | 1/2009 | Barnwell | |
| 2009/0044702 A1 | 2/2009 | Adamek et al. | |
| 2009/0056292 A1 | 3/2009 | Fornof et al. | |
| 2009/0067986 A1 | 3/2009 | Mignano | |
| 2009/0101013 A1 | 4/2009 | Moredock | |
| 2009/0263238 A1 | 10/2009 | Jarrah | |
| 2010/0126145 A1 | 5/2010 | He et al. | |
| 2010/0180854 A1 | 7/2010 | Baumann et al. | |
| 2010/0229511 A1 | 9/2010 | Steins et al. | |
| 2010/0285101 A1 * | 11/2010 | Moore | B32B 27/02 424/445 |
| 2011/0180051 A1 | 7/2011 | Schwandt et al. | |
| 2011/0198280 A1 | 8/2011 | Jones et al. | |
| 2011/0247309 A1 | 10/2011 | Smith et al. | |
| 2011/0252974 A1 | 10/2011 | Verdegan et al. | |
| 2011/0263496 A1 * | 10/2011 | Fineman | A61K 38/26 514/7.4 |
| 2012/0034083 A1 | 2/2012 | Shoji et al. | |
| 2012/0118200 A1 | 5/2012 | Howell et al. | |
| 2012/0315225 A1 | 12/2012 | Porbeni et al. | |
| 2013/0037481 A1 | 2/2013 | Lalouch et al. | |
| 2013/0056407 A1 | 3/2013 | Parikh et al. | |
| 2013/0167816 A1 | 7/2013 | Dawar et al. | |
| 2014/0033668 A1 | 2/2014 | Kleynen | |
| 2014/0069432 A1 | 3/2014 | Mebasser et al. | |
| 2014/0096683 A1 | 4/2014 | Azwell et al. | |
| 2014/0326661 A1 | 11/2014 | Madsen et al. | |
| 2015/0047582 A1 | 2/2015 | Dawar et al. | |
| 2015/0075377 A1 | 3/2015 | Gorbach et al. | |
| 2015/0173577 A1 | 6/2015 | Kim et al. | |
| 2016/0030875 A1 | 2/2016 | Parikh et al. | |
| 2016/0245157 A1 | 8/2016 | Wilkins et al. | |
| 2018/0030868 A1 | 2/2018 | Elsaesser et al. | |
| 2018/0117512 A1 | 5/2018 | Janakiraman et al. | |
| 2019/0153635 A1 * | 5/2019 | Ikejiri | D03D 13/008 |

FOREIGN PATENT DOCUMENTS

| | | |
|---|---|---|
| CN | 104334284 A | 2/2015 |
| DE | 100 44 615 | 4/2002 |
| DE | 203 02 824 U1 | 8/2004 |
| DE | 10 2006 024 816 | 12/2007 |
| EP | 1 532 352 A1 | 5/2005 |
| EP | 1 645 320 A1 | 4/2006 |
| FR | 2933626 A1 | 1/2010 |
| JP | H11-141325 | 5/1999 |
| WO | WO 2011/100712 | 8/2011 |
| WO | WO2012/016659 | 8/2012 |

(56) References Cited

FOREIGN PATENT DOCUMENTS

| WO | WO 2012/106659 | 8/2012 |
| WO | WO2012/106659 | 8/2012 |
| WO | WO 2013/025445 | 2/2013 |
| WO | WO-2016/046944 A1 | 3/2016 |
| WO | WO 2016/159951 | 10/2016 |
| WO | WO-2016/159951 A1 | 10/2016 |
| WO | WO 2017/189516 | 11/2017 |
| WO | WO-2018/002244 A1 | 1/2018 |

OTHER PUBLICATIONS

International Search Report and Written Opinion issued for PCT/U2017/029315, dated Aug. 1, 2017, 14 pages.
International Search Report and Written Opinion issued for PCT/US2015/023290, dated Jun. 29, 2015, 10 pages.
International Search Report and Written Opinion issued for PCT/US2016/036384, dated Aug. 25, 2016, 9 pages.
International Search Report and Written Opinion issued for PCT/US2016/036432, dated Aug. 31, 2016, 24 pages.
International Search Report and Written Opinion issued for PCT/US2016/048912, dated Nov. 10, 2016, 12 pages.
Chinese Office Action from corresponding CN Application No. 2016800326319, dated Mar. 18, 2019, pp. 1-6.
First Office Action for Chinese Patent App. No. 2015800784030 dated Mar. 1, 2019, 19 pages (with translation).
Office Action for U.S. Appl. No. 15/561,170 dated Mar. 14, 2019, 11 pages.
Office Action issued for U.S. Appl. No. 15/580,481 dated Feb. 14, 2020.
First Examination Report for Indian Patent App. No. 201847007059 dated May 5, 2020, 6 pages.
First Office Action for Chinese Patent App. No. 201780024820.6 dated Mar. 31, 2020, 22 pages (with translation).
International Search Report and Written Opinion Issues for PCT Application No. PCT/US2016/047755, dated Nov. 4, 2016, 10 pages.
Extended European Search Report for European Patent App. No. 17790235.0 dated Oct. 25, 2019, 9 pages.
Office Action issued for U.S. Appl. No. 16/096,585, dated Oct. 16, 2019, 10 pages.
Final Office Action issued for U.S. Appl. No. 15/580,481, dated Aug. 17, 2020, 27 pages.

* cited by examiner

HIGH SPEED ROTATING CRANKCASE VENTILATION FILTER MEDIA AND MEDIA PACK

CROSS-REFERENCE TO RELATED APPLICATIONS

This application is a national stage of PCT Application No. PCT/US2016/047755, filed Aug. 19, 2016, which claims priority to U.S. Provisional Patent Application No. 62/208,284, entitled "HIGH SPEED ROTATING CRANKCASE VENTILATION FILTER MEDIA," filed Aug. 21, 2015. The contents of both applications are hereby incorporated by reference in their entirety.

TECHNICAL FIELD

The present application relates to crankcase ventilation systems.

BACKGROUND

During operation of an internal combustion engine, a fraction of combustion gases can flow out of the combustion cylinder and into the crankcase of the engine. These gases are often called "blowby" gases. The blowby gases include a mixture of aerosols, oils, and air. If vented directly to the ambient, the blowby gases can harm the environment. Accordingly, the blowby gases are typically routed out of the crankcase via a crankcase ventilation system. The crankcase ventilation system may pass the blowby gases through a coalescer (i.e., a coalescing filter element) to remove a majority of the aerosols and oils contained in the blowby gases. The coalescer includes filter media. The filtered blowby gases are then either vented to the ambient (in open crankcase ventilation systems) or routed back to the air intake for the internal combustion engine for further combustion (in closed crankcase ventilation systems).

Some crankcase ventilation systems utilize rotating coalescers that increase the filter efficiency of the coalescing filter elements by rotating the filter media during filtering. In rotating filter cartridges, the contaminants (e.g., oil droplets suspended and transported by blowby gases) are separated inside the filter media of the filter cartridge through the particle capture mechanisms, such as inertial impaction, interception, diffusion, and gravitational forces onto the fibers. By rotating the filter media, inertial impaction and gravitational forces are enhanced by the additional centrifugal force. Additionally, the rotation of the filter cartridge can create a pumping effect, which reduces the pressure drop through the filtration system. Rotating filter cartridges may include fibrous filters as well as centrifugal separation devices.

SUMMARY

One example embodiment relates to filter media. The filter media includes fibers that have a geometric mean fiber diameter between 5 to 40 µm. The fibers have a solidity between 5% and 30%. The filter media has a compressibility of less than 25% at pressures greater than 20 kPa.

Another example embodiment relates to a high-speed rotating coalescer element. The high-speed rotating coalescer element includes a first endplate, a second endplate, and a filter media pack comprising filter media positioned between the first endplate and the second endplate. The filter media includes fibers that have a geometric mean fiber diameter between 5 to 40 µm. The fibers have a solidity between 5% and 30%. The filter media has a compressibility of less than 25% at pressures greater than 20 kPa.

A further example embodiment relates to a filter media pack for a high-speed rotating coalescer. The filter media pack includes filter media having fibers that have a geometric mean fiber diameter between 5 to 40 µm. The fibers have a solidity between 5% and 30%. The filter media has a compressibility of less than 25% at pressures greater than 20 kPa.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIGS. 4 through 10 show various comparison charts and graphs comparing high-speed rotating coalescer (HSRC) media with conventional media.

DETAILED DESCRIPTION

Referring to the figures generally, filter media and media packs that provide robust performance in HSRC elements for crankcase ventilation systems are described. The filter media is HSRC filter media. As such, the filter media has a higher resistance to compressibility than traditional coalescer filter media, such as filter media used in low-speed rotating coalescer arrangements or stationary coalescer arrangements. The HSRC filter media may comprise a single layer of filter media, multiple layers of filter media with differing properties, or filter media whose properties vary as a function of depth designed to optimize performance (i.e., gradient filter media). As described in further detail below, the HSRC filter media structure has a higher resistance to compressibility than traditional coalescer filter media.

Figure 1:
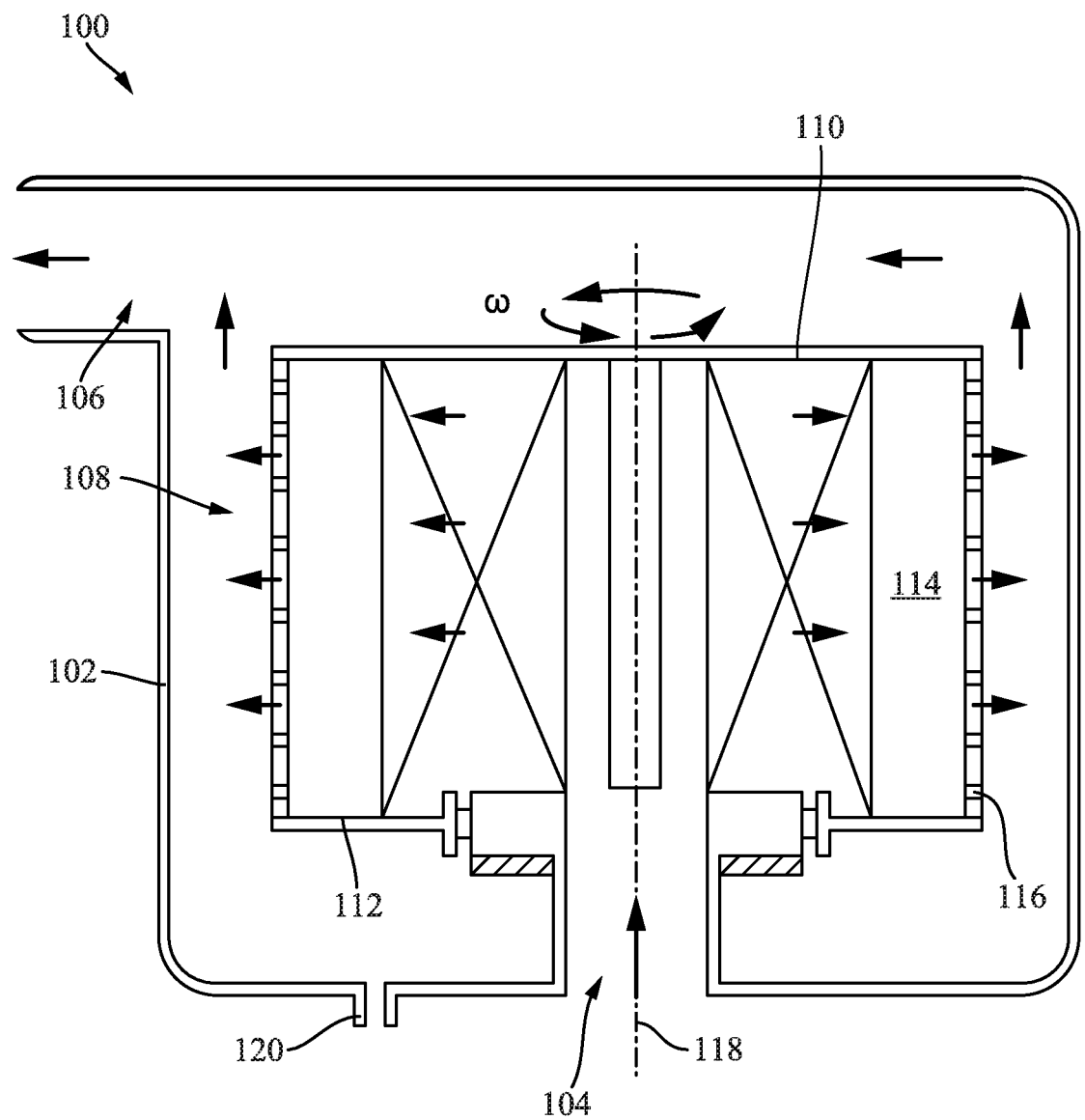
FIG. 1 shows a cross-sectional view of a crankcase ventilation system according to an example embodiment.

Referring to FIG. 1, a cross-sectional view of a crankcase ventilation system 100 is shown according to an example embodiment. The crankcase ventilation system 100 includes a stationary housing 102. The stationary housing 102 includes a blowby gas inlet 104 that receives blowby gases from a crankcase of an internal combustion engine. The internal combustion engine may be, for example, a diesel internal combustion engine. The stationary housing 102 further includes a filtered blowby gas outlet 106. The outlet 106 vents filtered blowby gas from the crankcase ventilation system 100. In some arrangements, the crankcase ventilation system 100 is a closed crankcase ventilation system. In such arrangements, the outlet 106 provides the filtered blowby gas to an air intake of the internal combustion engine. In other arrangements, the crankcase ventilation system 100 is an open crankcase ventilation system. In such arrangements, the outlet 106 provides the filtered blowby gas to the ambient environment.

The crankcase ventilation system 100 includes a coalescer 108. The coalescer 108 is a rotating coalescer. The coalescer 108 includes a first endplate 110 and a second endplate 112 axially spaced from the first endplate 110. A filter media pack 114 comprised of filter media is positioned between the first endplate 110 and the second endplate 112. The filter media pack 114 includes fibrous filter media as described in further detail below. The fibrous filter media may include any of meltblown polyester filter media, meltblown polyphenylene sulfide filter media, needle-punched spunbond polyphenylene sulfide filter media, microglass with acrylic binder filter media, microglass with phenolic binder filter media, meltblown nylon filter media, needlefelt polyethylene terephthalate filter media, or another suitable filter media. The filter media of the filter media pack 114 is described in further detail below.

Figure 2:
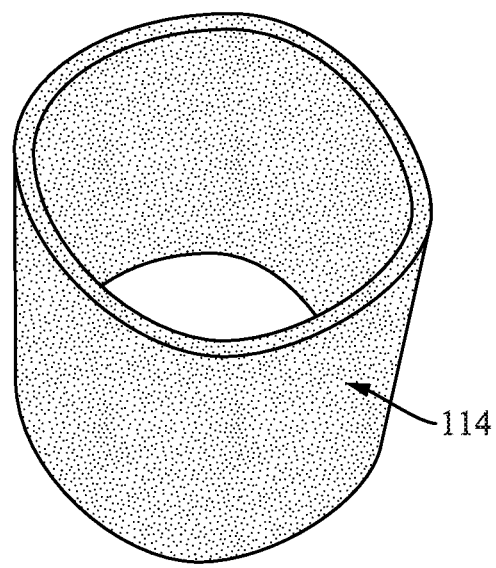
FIG. 2 is a perspective view of a filter media pack usable with the crankcase ventilation system of FIG. 1.
Figure 3:
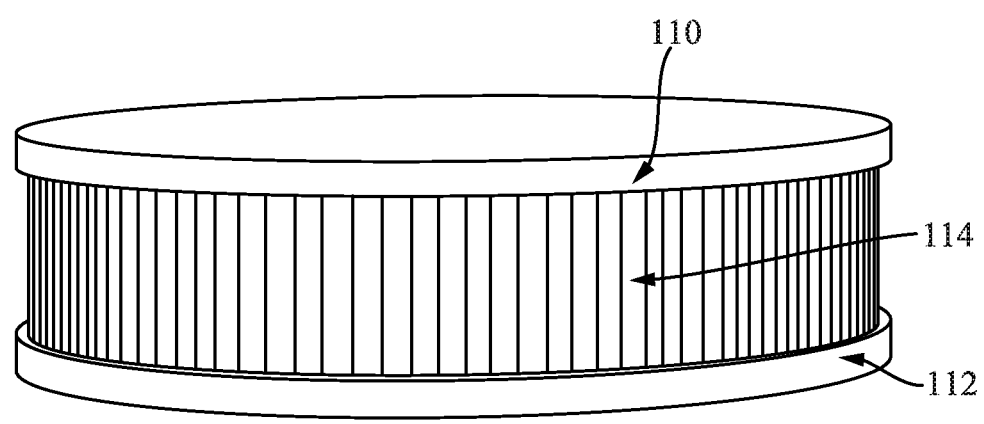
FIG. 3 is a perspective view of an alternate filter media pack shown as part of a filter element usable with the crankcase ventilation system of FIG. 1.

The filter media pack 114 is sealed to the first and second endplates 110 and 112 such that blowby gases entering the inlet 104 pass through the filter media pack 114. The filter media pack 114 is cylindrical in shape. In some arrangements, the filter media pack 114 is an open-ended cylindrical media pack (e.g., as shown in FIG. 2). In such arrangements, the filter media forms a closed-loop structure with open ends that is secured to the first and second endplates 110 and 112 (e.g., via potting, via adhesive, via mechanical sealing systems, etc.). In further arrangements, the filter media pack 114 is coupled with additional layers of media either upstream or downstream of the primary filter media for structural support or for additional filtration. In such arrangements, the media pack 114 retains the cylindrical closed-loop structure. The additional layers of media may be bonded or otherwise secured to the filter media pack 114. In additional arrangements, the filter media pack 114 includes a pleated filter media (e.g., as shown in FIG. 3). In further arrangements, the filter media pack 114 comprises non-pleated cylindrical filter media.

In some arrangements, the coalescer 108 includes a support cage 116 that extends between the first and second endplates 110 and 112 adjacent to the filter media pack 114. The support cage 116 provides a support surface for the filter media pack 114. The support cage 116 is positioned radially outward of the filter media pack 114 with respect to a central axis 118 of the coalescer 108.

During operation, the crankcase ventilation system 100 receives blowby gases from an internal combustion engine through the inlet 104. The blowby gases flow from an inner area of the coalescer element 108 through the filter media pack 114 and out of the outlet 106 (as designated by the arrows). The coalescer 108 is rotated about its central axis 118 at a rotational speed $\omega$. The coalescer 108 is a HSRC element. As used herein, a HSRC element refers to a rotating coalescer element that generates centrifugal forces at the filter media in excess of 500 G (G is defined below in equation 1). In some arrangements, the rotational speed $\omega$ can exceed 10,000 RPM. The coalescer 108 may be rotated, for example, by an electric motor, an oil driven motor, a mechanical linkage between the coalescer 108 and the internal combustion engine, or the like. The contaminants (e.g., oil droplets, aerosol, etc.) transported by blowby gases are separated inside the filter media pack 114 through particle capture mechanisms, such as inertial impaction, interception, diffusion, and gravitational forces onto the fibers. By rotating the filter media pack 114, inertial impaction is enhanced by the additional centrifugal force. Additionally, the rotation of the coalescer 108 can create a pumping effect, which reduces the pressure drop through the crankcase ventilation system 100. In some arrangements, the support cage 116 includes fins or ribs to enhance the pumping effect. Separated contaminants, such as oil, fall to the bottom of the stationary housing 102 where the contaminants can exit the housing through the drain 120.

As discussed above, the crankcase ventilation system 100 removes contaminants, such as fine oil droplets from the blowby gas. This helps to reduce emissions from the internal combustion engine. In arrangements where the crankcase ventilation system 100 is part of a closed loop crankcase ventilation system, the removal of the contaminants also protects intake components of the internal combustion engine, such as a turbocharger. In some arrangements, the crankcase ventilation system 100 is configured for high contaminant removal efficiency. For example, the crankcase ventilation system 100 can be configured to remove greater than 99% of particles as small as 0.3 µm with a pressure drop of less than 0.8 kPa at full load on the internal combustion engine. In some arrangements, the life of the coalescer 108 is greater than 7000 operating hours without significant deterioration in performance. The coalescer can operate at temperatures up to 120 degrees Celsius. To achieve the above-noted design parameters, the coalescer 108 is a HSRC. As discussed below, the media pack 114 has different media characteristics than media packs used for stationary (i.e., non-rotating) coalescers and low speed rotating coalescers (LSRC). A LSRC is a coalescer that rotates and creates less than about 200 to 500 G of centrifugal force, while a HSRC rotates and creates more than 500 G of centrifugal force and can exceed 1000 G of centrifugal force. G is defined by Equation 1.

$$G = \frac{\omega^2 R}{9.81} \quad (1)$$

In Equation 1, $\omega$ is the rotational speed of a given rotating coalescer in radians per second and R is the radius of the rotating coalescer in meters.

HSRC elements, such as the coalescer 108, are designed to different system and operating parameters than conventional stationary (i.e., non-rotating) coalescer applications and conventional LSRC applications. The conventional stationary coalescer applications and the conventional LSRC applications are herein referred to as "conventional crankcase ventilation applications." In these conventional crankcase ventilation applications, the geometric mean media fiber diameter, solidity, and thickness are controlled to meet the required removal efficiency, pressure drop, and life requirements. As used herein, the phrase "geometric mean" refers to a mean that indicates the central tendency or typical value of a set of numbers identified by taking the nth root of the product of n numbers (i.e., $(\Pi_{i=1}^{n} x_i)^{1/n}$ for a set of numbers $\{x_i\}_{i=1}^{n}$), as opposed to the arithmetic mean which relies on dividing the sum of n numbers by n. For internal combustion engine air intake filtration systems and conventional crankcase ventilation applications, low pressure drops may be required and media with low solidity, less than 15% is used. Table 1 summarizes some of the characteristics of filter media used in various crankcase ventilation applications.

TABLE 1

| Media | Description | Material | Frazier Permeability (cfm) | Geometric Mean Fiber Diameter (μm) | Solidity (%) | Flexural Modulus (Mpa) | Compressibility at 20 kPa (%) |
|---|---|---|---|---|---|---|---|
| A | Meltblown | Polyester - amorphous | 19.3 | 7.0 | 12-15 | 2300-2800 | 20 |
| B | Needle-punched Spunbond | Polyphenylene sulfide | 35.0 | 15.1 | 18-22 | 4300 | 7 |
| C | Wetlaid | Microglass w/ acrylic binder | 24.4 | 1.2 | 8 | 7600 | 37 |
| D | Meltblown | Nyolon 6,6 | 128 | 41.5 | 13 | 2800 | 35 |
| E | Needlefelt | Polyethylene terphthalate | 280 | 36.7 | 16 | 2800 | 21 |
| F | Meltblown | Polyester - crystalline | 16.0 | 27.2 | 21 | 2300-2800 | 16 |

Referring to Table 1, media A, C, D and E are conventional media used in conventional crankcase ventilation applications. Media B and F are examples of the media that is usable in HSRC applications, such as the media pack 114 of the coalescer 108. As used herein, media B and F may be referred to as "HSRC media." A variety of materials, including polyester, glass, cellulose, metal fibers, and polyamide, have been used for conventional crankcase ventilation applications. However, in HSRC applications, the filter media is exposed to greater than 20 kPa pressure due to centrifugal forces caused by the high speed rotation. The centrifugal forces can compress the filter media, which negatively impacts the performance in HSRC applications. This is shown in graphs 400 and 500, which are discussed below.

Figure 4:
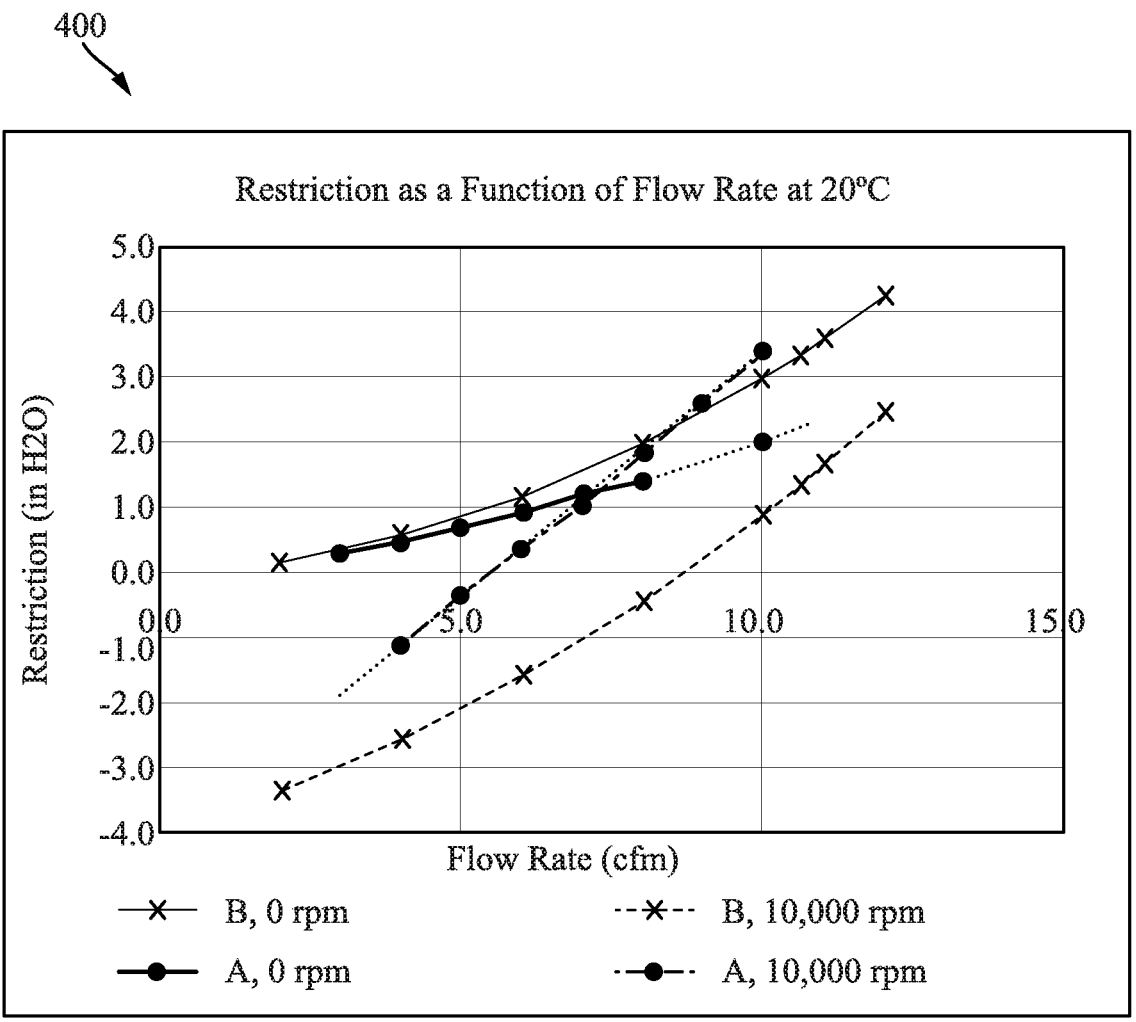

FIG. 4 shows a graph 400 of restriction as a function of flow rate at a temperature of 20 degrees Celsius for two types of filter media: media A and media B (as listed in Table 1). Media A is a polyester (PE) meltblown media, which is produced using a process as described in U.S. Pat. No. 8,231,752, which is herein incorporated by reference in its entirety and for all purposes, under typical process conditions. Such media is typical for conventional crankcase ventilation applications. Media B is a needle-punched polyphenylene sulfide (PPS) filter media that is usable in the filter media pack 114 of the coalescer 108. Accordingly, the media B is usable in HSRC applications. Restriction results for the two media at 0 and 10,000 RPM, which produces approximately 5700 G on the filter media, are shown. For media A, the graph 400 shows that slope of the curve becomes much steeper upon rotation at high speed (e.g., 10,000 RPM). In fact, the restriction at high speed actually exceeds the stationary restriction for flow rates greater than approximately 7 cubic feet per minute (CFM). Thus, a filter utilizing media A becomes more restrictive and unable to meet required filtering efficiencies due to the increased pressure drop and increased flow rate restrictions. The increased pressure drop and increased flow rate restriction is caused by compression and collapse of media A's structure at high rotational speeds. However, the restriction of media B is reduced upon rotation at high speed (e.g., 10,000 RPM) at all flow rates compared to media A. Accordingly, media B allows for both high removal contaminant efficiency and low pressure drop to be achieved in HSRC applications.

Figure 5:
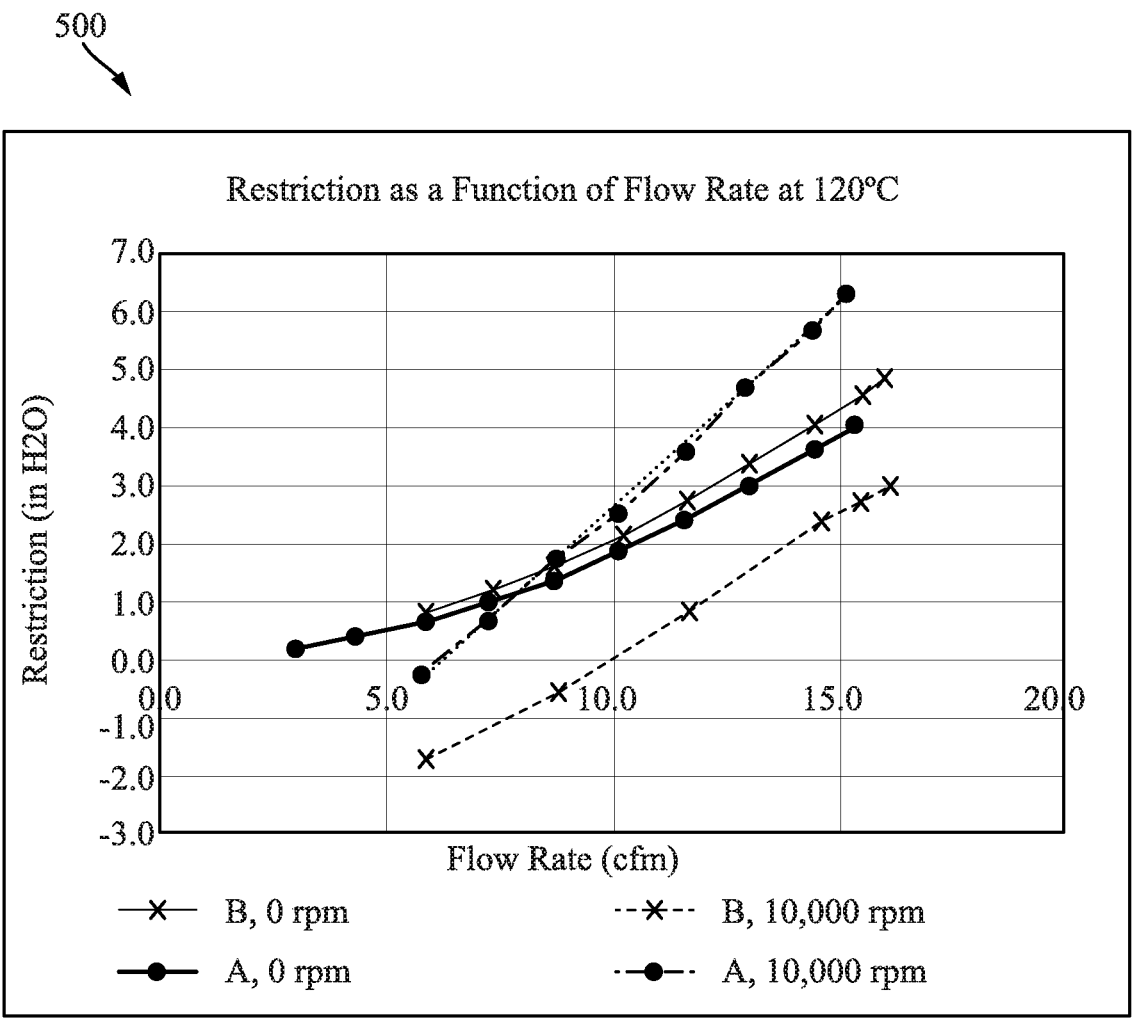

Referring to FIG. 5, a graph 500 of restriction as a function of flow rate at a temperature of 120 degrees Celsius for two types of filter media: media A and media B (as listed in Table 1) is shown. As shown in graph 500, media A and media B perform similarly at 120 degrees Celsius as at 20 degrees Celsius (as shown in graph 400). Although the overall behavior of media A and media B at the higher temperature is similar, the effects on restriction are more dramatic at the higher engine operating temperatures for media A, where the slope of the curve at 10,000 RPM for media A is steeper than at 20 degrees Celsius. Accordingly, the adverse impact of rotation on restriction is worse at higher temperature. This has severe negative implications for crankcase ventilation applications. Many crankcase ventilation systems are mounted in or near the internal combustion engine compartment and experience high temperatures.

Coalescer media used in crankcase ventilation applications must exhibit both a high removal efficiency for fine droplets, as well as low pressure drop. Frazier permeability, as determined using ASTM D737 or similar test method, is a media property that is directly related to pressure drop under stationary conditions and indirectly related to removal efficiency. Frazier permeability is reported as the air flow rate, measured in cubic feet per minute (cfm), at 0.5 inches of water pressure drop. In general, lower values for Frazier permeability correspond to higher pressure drop and higher removal efficiency. For HSRC applications, it is desirable that the Frazier permeability be less than or equal to 250 cfm in order to meet these requirements. It is preferable that the Frazier permeability be between 10 and 100 cfm in order to meet both removal efficiency and pressure drop requirements for crankcase ventilation applications. In a more particular implementation, the Frazier permeability may be between 10 and 50 cfm.

The relatively poor performance of conventional media, such as media A as demonstrated in graphs 400 and 500, in HSRC applications is due to compression of the filter media and collapse of the media's structure. The filter media compresses and collapses under the high centrifugal forces experienced during high speed rotation. While it is known that media compression increases pressure drop, the media design challenge of reducing pressure drop while maintaining high removal efficiency is achieved by the HSRC media discussed herein. Accordingly, in HSRC applications, media that both (1) resists compression and structural collapse at high rotational speeds and (2) maintains high removal efficiency is needed. Such media is described in further detail below. The below-described specific values of compressibility are understood to be the limits (i.e., the maximum compressiblities) at room temperature (i.e., 20 degrees Celsius) unless otherwise stated (e.g., as done with respect to the description of FIG. 7).

The media pack 114 of coalescer 108 includes HSRC filter media composed of fibers of a single polymeric material (e.g., PPS), a single copolymer (e.g., polyoxymethylene copolymer), or a single polymer blend (e.g., polybutylene terephtalate-polyethylene terephthalate blend) that possesses characteristics that provide functionality in terms of high oil droplet removal efficiency and low restriction at centrifugal forces in excess of about 200 G, and more specifically in excess of 1000 G. In other arrangements, the HSRC filter media may be comprised of more than one type of polymer, microglass, or metal fibers. In such arrangements, the HSRC filter media may be arranged as a composite media (e.g., a media having a plurality of different media fibers), a gradient (e.g., a media having a plurality of different media fibers arranged in a manner in which the filter element has a filtering efficiency that varies across a depth of the filter element), or a multilayer media (e.g., a media having different filter materials layered over one another) to achieve different filtering regions. Secondarily, the media of the media pack 114 exhibits chemical compatibility and thermal properties suitable for crankcase ventilation applications. Thus, the filter media should be chemically compatible with engine oil, glycol, and water and be able to withstand temperatures in the range of 80 to 120 degrees Celsius without loss of functionality. In general, HSRC filter media for these applications should have a geometric mean fiber diameter within the range of 5 to 40 μm, solidity between 5 and 30%, and a Frazier permeability of up to 250 cfm at 0.5 inches of water pressure drop. In some arrangements, the Frazier permeability is 10 to 100 cfm at 0.5 inches of water pressure drop. In some arrangements, the filter media has a geometric mean fiber diameter within the range of 10 to 20 μm, solidity between 15 and 30%, and a Frazier permeability of 10 to 20 cfm at 0.5 inches of water pressure drop. Further, the filter media has a compressibility of less than 20% at pressures greater than 20 kPa. In some arrangements, the filter media has a compressibility of less than 15% at pressures greater than 20 kPa. As used herein, "compressibility" is the relative change in filter media volume in response to pressure or force. Specific examples of compressibility discussed herein were determined by measuring the change in thickness of the filter media while increasing the amount of force applied to the surface of the media over the range of about 1 to 30 kPa. "Compressibility" is defined herein as the percent change in volume of the filter media at a specified pressure relative to the volume at 1 kPa. Thus, a filter media that has a thickness of 1 mm at 1 kPa and of 0.9 mm at 10 kPa, has a compressibility of 10% at 10 kPa. Media compressibility (at a given temperature) as a function of pressure or centrifugal force is governed by many factors, including, but not limited to, the fiber size distribution of the media, media solidity, the flexural modulus of the polymer (i.e., the fiber material), the strength and degree of fiber to fiber bonding in the media, and degree of entanglement of the fibers.

Figure 6:
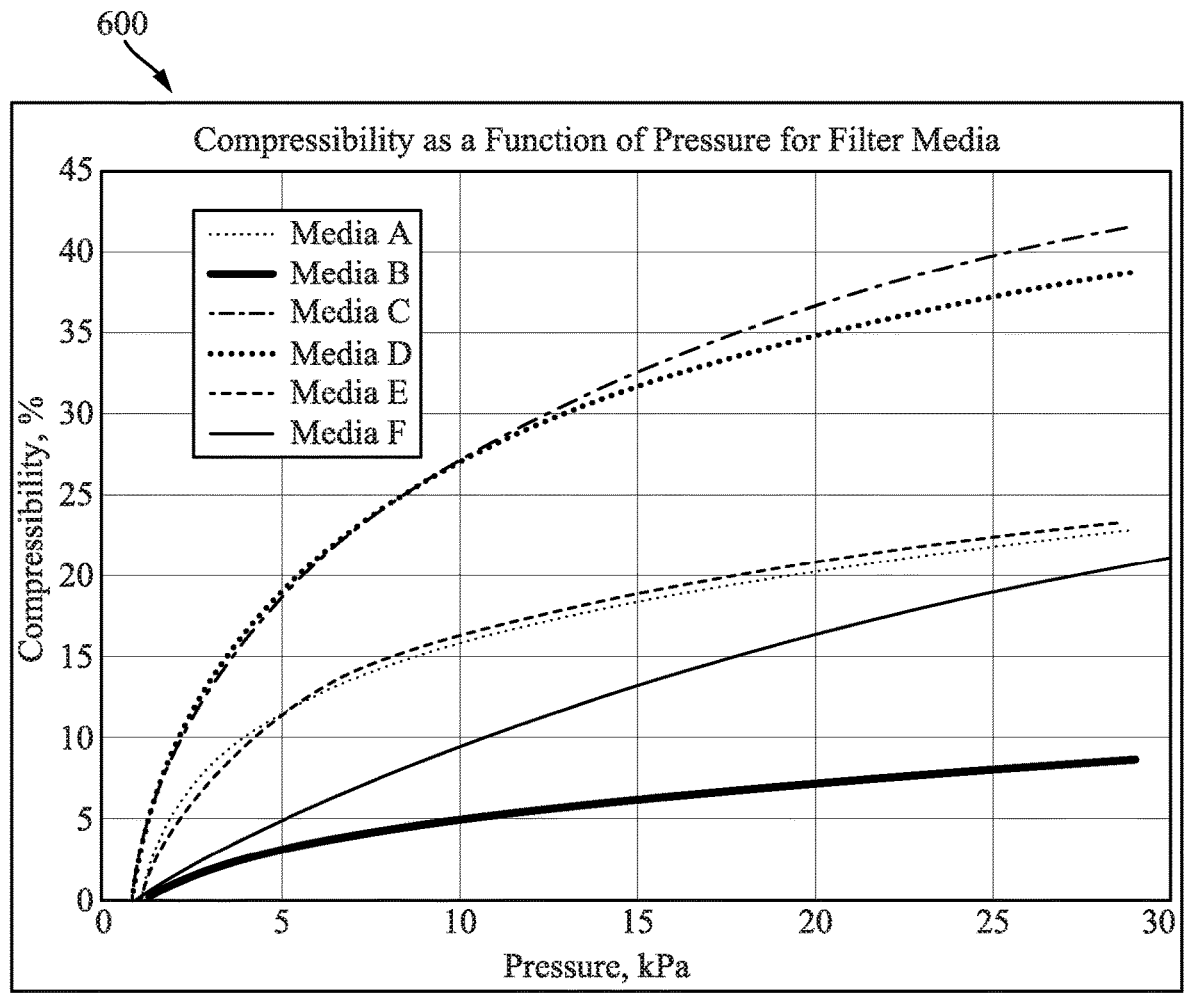

In FIG. 6, a graph 600 of media compressibility as a function of pressure for the various filter media described in Table 1 is shown. The graph 600 shows the compressibilities of the six filter media described in Table 1. The six types of filter media include four types of conventional media (i.e., A, C, D, and E) and two examples of media for HSRC applications, media B and F. Media A and B are discussed above with respect to FIGS. 4 and 5. Media C is a microglass media bonded together with an acrylic resin. Media D is a nylon 6,6 spun bond media. Media E is a polyethylene terephthalate needle punched media. Media F is a polyester (PE) meltblown HSRC media that is usable in the filter media pack 114 of the coalescer 108. Media F is made from the same polymer and by the same process as media A, but using different process conditions than media A, referred to as process 2 in this case, to yield media with properties summarized in Table 1 that are more desirable for HSRC media. As shown in graph 600, media compressibility increases rapidly with applied pressure for the conventional media (A, C, D, and E). The media compressibility for the conventional media begins to level out at pressures in excess of about 5 to 20 kPa due to collapse of the media structure. As previously noted, media used in HSRC applications will experience in excess of 20 kPa due to the centrifugal forces imparted on the media from the high speed rotation. Thus, media designed for stationary and low speed applications will not retain their structure in HSRC applications, and compressibility at pressures on the order of 20 kPa must be considered for HSRC.

Figure 7:
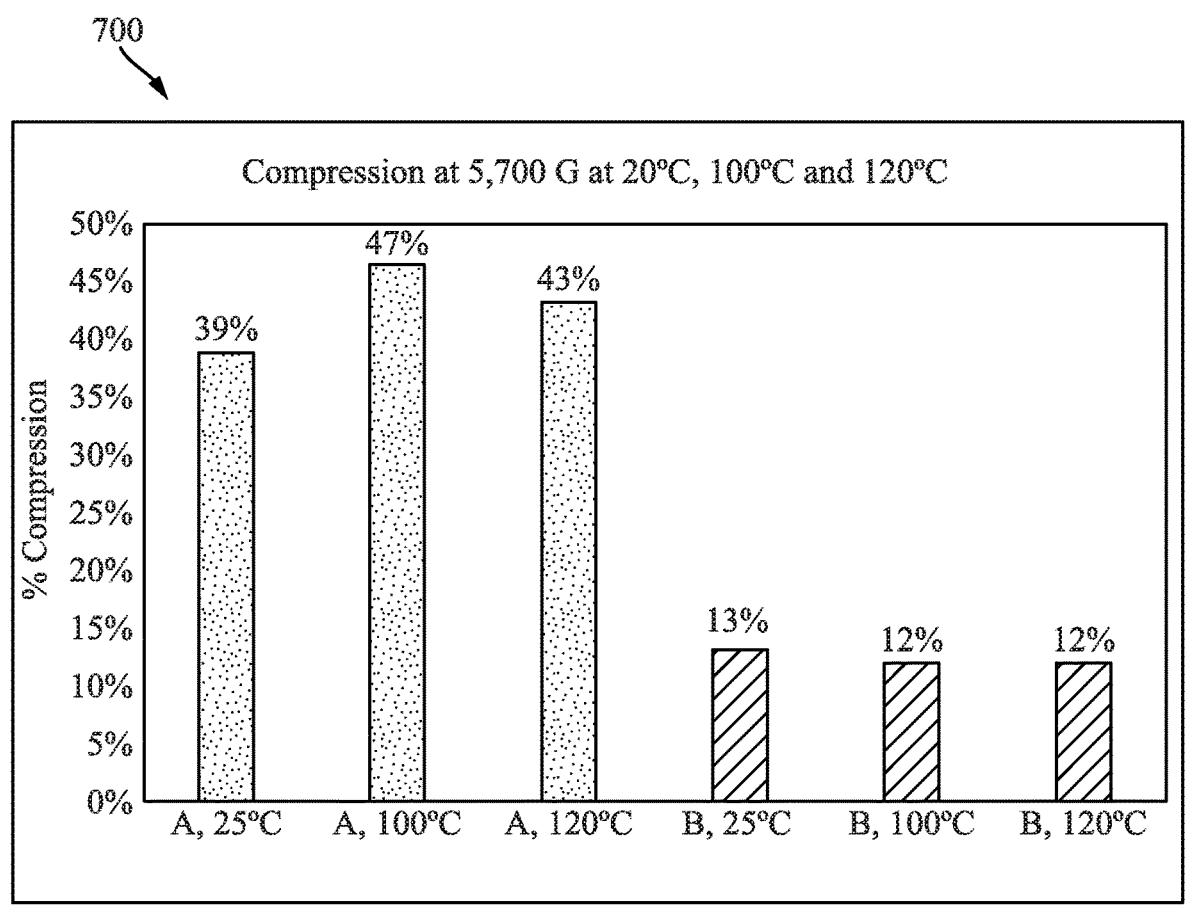

FIG. 7 shows a bar graph 700 comparing the compressibility of conventional media A and the HSRC media B at temperatures of 25, 100, and 120 degrees Celsius. As shown in the graph 700, the resistance to compression for HSRC media B is retained even at elevated temperatures that can be experienced in crankcase ventilation system applications.

The compressibility of HSRC media and media packs (e.g., media pack 114) due to centrifugal forces is related to the media's resistance to compression due to pressure drop. However, compression due to centrifugal forces also takes into account other factors, such as media pack design and application factors (e.g., rotational speed, radius of the media pack, etc.). In some arrangements, the HSRC media of the media pack 114 has a compressibility of less than 20% at 200 G at room temperature (i.e., at 20 degrees Celsius). In further arrangements, the HSRC media of the media pack 114 has a compressibility of less than 20% at 1000 G at room temperature (i.e., at 20 degrees Celsius). In additional arrangements, the media of the media pack 114 has a compressibility of less than 15% at 200 G. In further arrangements, the media of the media pack 114 has a compressibility of less than 15% at 1000 G.

Figure 8:
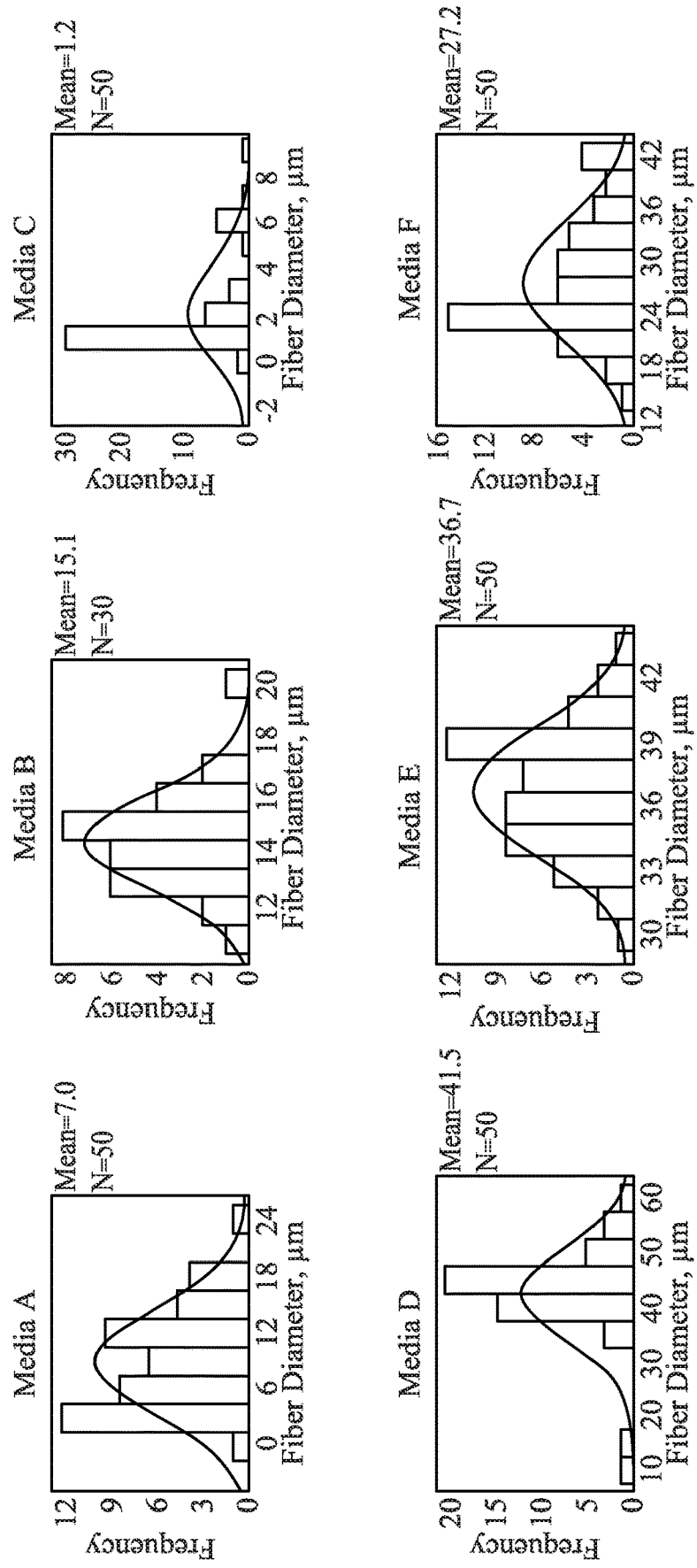

As previously discussed, the HSRC filter media and media packs (e.g., media pack 114) have a geometric mean fiber diameter within the range of 5 to 40 μm in order to provide the removal efficiency, pressure drop, and compressibility requirements of HSRC applications. Referring to FIG. 8, histograms 800 of fiber diameters for the media described in Table 1 (i.e., the conventional media A, C, D, and E, and the HSRC media B and F) are shown. In FIG. 8, "mean" refers to the geometric mean and "N" refers to the number of fibers that were sized. As shown in FIG. 8, the geometric mean fiber diameters of the media are within the indicated range of 5 to 40 μm. Geometric mean fiber diameters significantly smaller than the range of 5 to 40 μm (e.g., as in media C) may provide high removal efficiency but also increase compressibility to an excessive degree, which can result in collapse of the media structure and undesirable increased pressure drop in HSRC applications. On the other hand, media D exhibits a geometric mean fiber diameter larger than the indicated range of 5 to 40 μm, and media E exhibits a geometric mean fiber diameter slightly smaller than the indicated range of 5 to 40 μm. Both media D and E exhibit undesirably low removal efficiencies and increased pressure drops under test conditions in HSRC applications. Both media D and E also exhibit Frazier permeability in excess of the above-indicated ranges of the HSRC filter media. In some particular arrangements, the geometric mean fiber diameter of HSRC media is within the range of 10 to 40 μm. Thus, the data shows that there is a range of geometric mean fiber diameters below which the media structure collapses and pressure drop becomes unacceptably high for HSRC applications. However, media with a geometric mean fiber diameters larger than about 5 to 10 μm may not provide the desired removal efficiency in conventional crankcase ventilation applications. This poses a contradiction, large fibers are desired to prevent collapse while fine fibers are needed for removal. In HSRC applications, the centrifugal forces caused by the high speed rotation of the coalescer element 108 enhance contaminant removal thereby helping to offset the detrimental effect of larger fiber diameter for removal. In general, geometric mean fiber diameters larger than about 40 μm do not provide the desired removal efficiency for HSRC. Thus, media B and F have a geometric mean fiber diameter within the range of 5 to 30 μm, which corresponds to the fiber diameter range where the media resists compression and provides the desired removal efficiencies. At higher rotational speeds, the desired range of fiber diameter can be extended to 5 to 40 μm.

Although the geometric mean fiber diameter of HSRC media is within the range of 5 to 40 μm, the HSRC media includes some fibers having a diameter larger than 20 μm in some arrangements. For example, note the relative numbers of fibers larger than 20 μm in media B and larger than 30 μm in media F. These larger fibers help to reduce the compressibility of the given media. Accordingly, in particular embodiments, the HSRC media (e.g., media B and F) include at least some larger fibers, but with a predominance of smaller fibers in the smallest mode as shown in the histograms 800. The relative abundance of the fibers larger than about 30 μm relative to smaller fibers should be low in order to not adversely impact contaminant removal. Accordingly, the HSRC media may include between 1 and 5% of the fibers larger than about 40 μm to reduce compressibility. In some arrangements, the HSRC media includes about 3% of fibers that are larger than 30 μm. In another arrangement, the HSRC media includes between 1 and 5% of fibers larger than about 20 μm. In further arrangements, the HSRC media includes a layer of filter media having a geometric mean diameter within the range of 5 to 40 μm and one or more upstream and/or downstream layers with fibers having a diameter greater than 30 μm.

Another factor that affects media compressibility is the solidity of the filter media. Solidity refers to the relative volume of a filter media that is physically occupied by media fibers. Thus, a completely nonporous solid possessing no voids in its structure has a solidity of 100%, while a gas or a liquid sample containing no solid material has a solidity of 0%. Numerically, solidity is equal to 100% minus the porosity of a filter media sample. At low solidity, the media becomes excessively compressible in HSRC applications. At high solidity, the media may become too restrictive, which can cause a high pressure drop in the crankcase ventilation system 100. In some arrangements, the HSRC media has a solidity between 5 and 30% (and more specifically between 5 and 25%). In other arrangements, the HSRC media has a preferred solidity of 15-30%. In further arrangements, the HSRC media has a more preferred solidity between 18 and 25%. As a point of reference, the non-HSRC media in table 1 have solidities of 8-16%. The above-noted solidities of 15-30% for the HSRC media are undesirable for conventional crankcase ventilation applications and air intake applications, as the resultant pressure drop is excessive. However, for HSRC applications, the high solidity is both desirable and possible because, at high speeds, rotation of the filter creates a pumping action that offsets the increased restriction of the filter media (e.g., as discussed above with respect to FIG. 1). As such, the ideal range of solidities for HSRC media is significantly greater than that for conventional crankcase ventilation media.

Material stiffness also affects media compressibility. For example, fibers with greater stiffness (i.e., a high flexural modulus) are more resistant to compression. Flexural modulus can be determined using the ASTM D790 test method or another test method. Conventional media A (PE—process 1), media D (nylon 6,6), and media E (PET), each have flexural moduli of approximately 2400 MPa to 2800 MPa. Media B (PPS) has a flexural modulus of approximately 4200 MPa. Media F (PE—process 2) has a flexural modulus between 2300 and 2800 MPa, but media F is expected to have a greater flexural modulus than media A as a result of its more crystalline polymer structure. Accordingly, media B and media F have a significantly higher stiffness than media A, media D, and media E. The flexural modulus does not depend exclusively on the specific polymer used, but also on the conditions under which the material was produced. For example, the stiffness of conventional media A may be significantly increased by slowing down the speed of the uptake mandrel during media production, which allows the polymer to cool more slowly and achieve a more crystalline and three-dimensional structure as observed with media F. For HSRC applications, the polymer from which the fibers are produced should have a flexural modulus of at least 2000 MPa at 23 degrees Celsius in order to resist collapse. In some arrangements, the polymer from which the fibers for the HSRC media are produced has a flexural modulus greater than 3000 MPa. In other arrangements, the polymer from which the fibers for the HSRC media are produced has a flexural modulus greater than 4000 MPa.

As previously described, the HSRC media and media packs (e.g., media pack 114) are made from fibers composed of a single polymer, a single copolymer, or a single polymer blend. In other arrangements, the HSRC filter media may be comprised of more than one type of polymer, microglass, or metal fibers. In such arrangements, the HSRC filter media may be arranged in a composite, a gradient, or a multilayer media that can have different material for different filtering regions. In contrast to conventional crankcase ventilation media, the desired properties, including resistance to compression, when obtained by means of a bi- or multi-component structure with scaffold fibers or particles, or through the use of binders or resins to hold the fibers in place, may result in less desirable performance tradeoffs. Compressibility of the resulting media may be strongly influenced by the strength and degree of fiber to fiber bonding. The use of a single polymer, a single copolymer, or a single polymer blend simplifies production and manufacturing and also enables the use of alternative manufacturing methods to achieve stronger fiber to fiber bonding when making the media pack 114. In some arrangements, the stronger fiber to fiber bonding is achieved by a thermal process. The nonwoven media is produced by a process, such as melt spinning, melt blowing, flash spinning, or spun laying, in which newly formed soft or molten fibers are laid down on top of one another, before they cool and stiffen, to form the web or mat. Upon cooling, the fibers are bonded to one another, without the need for additional binders or resins. The thermal production process ensures an abundance of strong fiber to fiber bonds within the HSRC media.

An increase in the three-dimensional structure of filter media also reduces media compression. Media produced by wet or dry laying processes, such as meltblowing and melt spinning, typically result in media whose individual fibers are largely oriented in a two-dimensional structure, approaching stacked X-Y planar structures in an X-Y-Z coordinate system where the X-Y plane is normal to the direction of flow through the filter media and where the Z axis is parallel to the direction of flow and defines a thickness of the media. Media A, media C, media D, and media E are examples of such media. To reduce compression, the HSRC media may be produced to have greater three-dimensional structure (e.g., by increasing fiber orientation in the Z direction). This can be achieved in a number of ways. In some arrangements, the three-dimensional character of the media B is enhanced by needle punching (i.e., needling). In other arrangements, the three-dimensional structure of the HSRC media is enhanced by other processes, such as the use of water jets (e.g., hydroentangling), air jets, and/or felting. In further arrangements, the three-dimensional structure of the HSRC media is enhanced by increasing the orientation of fibers in the Z direction during the media production process by, for example, by decreasing the line speed used to produce the media as in the case of media F.

Figures 9, 10:
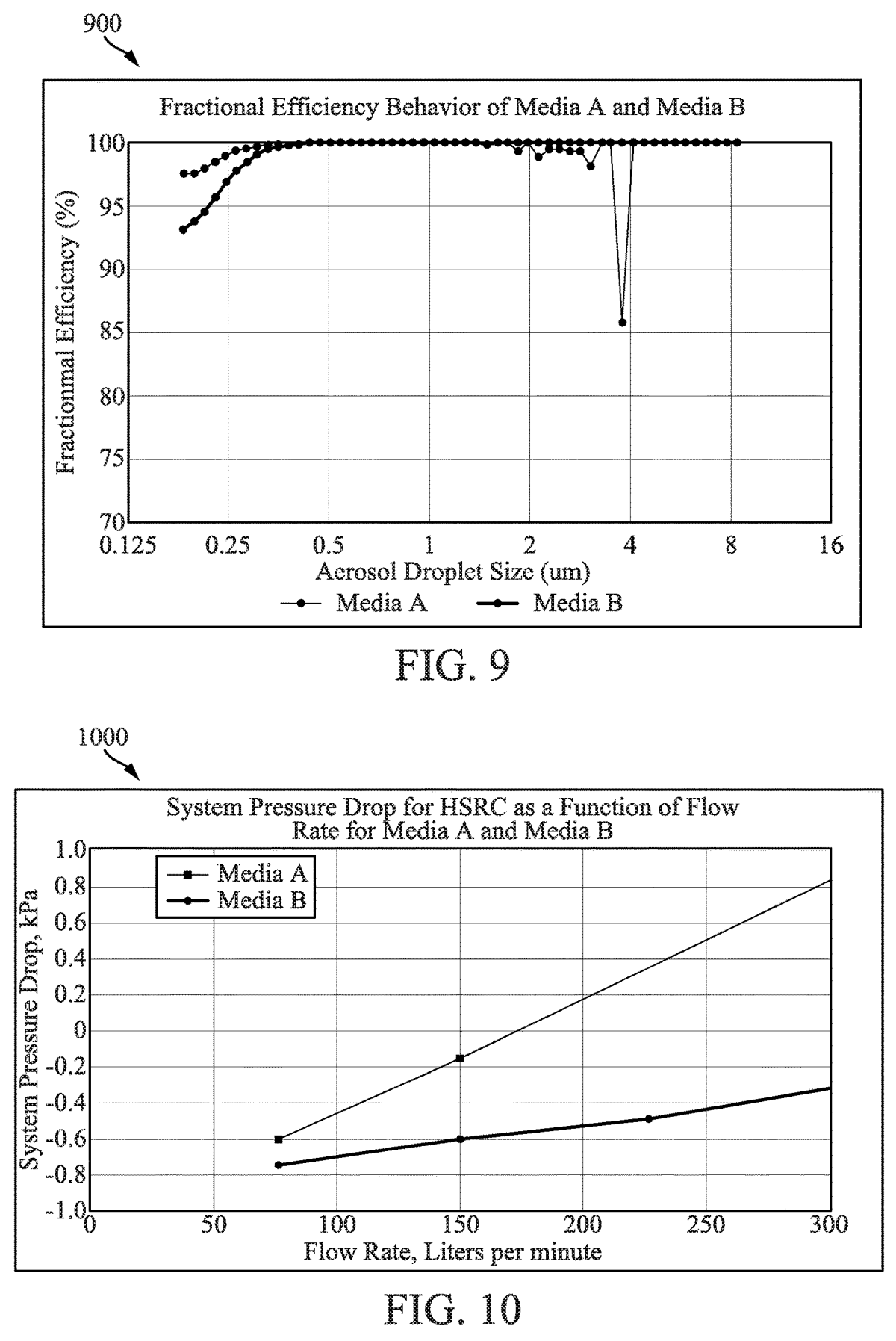

The above-described HSRC media (e.g., media B and media F) and media packs (e.g., media pack 114) provide benefits over conventional crankcase ventilation media for HSRC applications. For example, the HSRC media is more efficient at contaminant removal for particles between 0.4 and 2.0 μm in diameter. In tests run at ambient temperatures, cumulative oil droplet removal efficiencies for particles between 0.4 and 2.0 μm in diameter of 99.94% and 99.97% were obtained, respectively, for conventional media A and media B. As shown in FIG. 9, a graph 900 of the fractional efficiencies for media A and media B are shown. As shown in graph 900, the fractional efficiencies for the two types of media are similar. However, media A has somewhat higher removal for particles smaller than about 0.3 μm, while media B has a higher removal for particles larger than 1.5 μm. For crankcase ventilation applications, the cumulative removal efficiency and removal of larger particles is of greater concern. While similar performance was obtained in terms of removal, media B exhibits significantly lower system pressure drop than conventional media A, which is shown in graph 1000 of FIG. 10. The lower pressure drop of media B is a distinct advantage over conventional media. In fact, media A, like other conventional media, are unable to meet the pressure drop requirements for the HSRC applications without sacrificing removal efficiency.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

As used herein, the term "about" or "approximately" when coupled to a number or a range means plus or minus five percent of the modified number or range. When a range is described as being between two numbers, the range is intended to be inclusive of the two numbers that define the range.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. Filter media comprising:
fibers having a geometric mean fiber diameter between 5 to 40 μm, the fibers having a solidity between 5% and 30%, and about three percent of the fibers have a diameter greater than 20 μm;
wherein the filter media has a compressibility of less than 25% at pressures greater than 20 kPa.

2. The filter media of claim 1, wherein the fibers are comprised of a polymeric material.

3. The filter media of claim 2, wherein the polymeric material is a needle-punched polyphenylene sulfide filter media.

4. The filter media of claim 1, wherein the filter media is formed into a cylindrical filter media pack.

5. The filter media of claim 4, wherein the filter media has a compressibility of less than 25% at 200 G, where G is defined by the equation $$G = \frac{\omega^2 R}{9.81},$$

where ω is a rotational speed of the filter media pack in radians per second and R is a radius of the filter media pack in meters.

6. The filter media of claim 5, wherein the filter media has a compressibility of less than 25% at 1000 G.

7. The filter media of claim 2, wherein the polymer material is a single polymer material, a single copolymer material, or a single polymer blend.

8. The filter media of claim 1, wherein the filter media has a Frazier permeability of less than or equal to 250 cubic feet per minute at 0.5 inches of water pressure drop.

9. The filter media of claim 1, wherein the fibers are first fibers and the geometric mean fiber diameter is a first geometric mean fiber diameter, wherein the filter media further comprises second fibers having a second geometric mean fiber diameter, the second geometric mean fiber diameter different than the first geometric fiber diameter.

10. The filter media of claim 9, wherein the second fibers are layered over the first fibers forming a multi-layer filter media.

11. The filter media of claim 9, wherein the second fibers are positioned with respect to the first fibers such that the filter media has a varying filtering efficiency across a depth of the filter media thereby forming a gradient efficiency filter media.

12. The filter media of claim 9, wherein the filter media is a composite filter media comprising the first fibers and the second fibers.

13. The filter media of claim 1, wherein the compressibility is at 20 degrees Celsius.

14. The filter media of claim 1, wherein the compressibility is at 120 degrees Celsius.

15. A high-speed rotating coalescer element comprising:
a first endplate;
a second endplate;
a filter media pack comprising filter media positioned between the first endplate and the second endplate, the filter media comprising fibers having a geometric mean fiber diameter between 5 to 40 μm, the fibers having a solidity between 5% and 30%, the filter media has a compressibility of less than 25% at pressures greater than 20 kPa.

16. The high-speed rotating coalescer element of claim 15, wherein the filter media has a Frazier permeability of less than or equal to 250 cubic feet per minute at 0.5 inches of water pressure drop.

17. The high-speed rotating coalescer element of claim 15, further comprising a support cage extending between the first and second endplates, the support cage positioned adjacent to the filter media pack such that the support cage provides a support surface for the filter media pack during rotation of the coalescer element.

18. The high-speed rotating coalescer element of claim 15, wherein the polymeric material is a needle-punched polyphenylene sulfide filter media.

19. The high-speed rotating coalescer element of claim 15, wherein the filter media pack is cylindrical in shape.

20. The high-speed rotating coalescer element of claim 19, wherein the filter media has a compressibility of less than 25% at 200 G, where G is defined by the equation $$G = \frac{\omega^2 R}{9.81},$$

where ω is a rotational speed of the filter media pack in radians per second and R is a radius of the filter media pack in meters.

21. The high-speed rotating coalescer element of claim 20, wherein the filter media has a compressibility of less than 25% at 1000 G.

22. The high-speed rotating coalescer element of claim 15, wherein about three percent of the fibers have a diameter greater than 20 μm.

23. The high-speed rotating coalescer element of claim 15, wherein the filter media has a Frazier permeability of less than or equal to 250 cubic feet per minute at 0.5 inches of water pressure drop.

24. The high-speed rotating coalescer element of claim 15, wherein the fibers are first fibers and the geometric mean fiber diameter is a first geometric mean fiber diameter, wherein the filter media further comprises second fibers having a second geometric mean fiber diameter, the second geometric mean fiber diameter different than the first geometric fiber diameter.

25. The high-speed rotating coalescer element of claim 24, wherein the second fibers are layered over the first fibers forming a multi-layer filter media.

26. The high-speed rotating coalescer element of claim 24, wherein the second fibers are positioned with respect to the first fibers such that the filter media has a varying filtering efficiency across a length of the filter media thereby forming a gradient efficiency filter media.

27. The high-speed rotating coalescer element of claim 24, wherein the filter media is a composite filter media comprising the first fibers and the second fibers.

28. The high-speed rotating coalescer element of claim 15, wherein the fibers are comprised of a polymeric material.

29. A filter media pack for use in a high-speed rotating coalescer, the filter media pack comprising:
filter media formed into a cylindrical filter media pack, the filter media having fibers of a polymeric material, the fibers having a geometric mean fiber diameter between 5 to 40 μm, the fibers having a solidity between 5% and 30%, the filter media has a compressibility of less than 25% at pressures greater than 20 kPa, and about three percent of the fibers have a diameter greater than 20 μm.

30. The filter media pack of claim 29, wherein the fibers having a Frazier permeability of less than or equal to 250 cubic feet per minute at 0.5 inches of water pressure drop.

31. The filter media pack of claim 29, wherein the fibers are comprised of a polymeric material.

32. The filter media pack of claim 31, wherein the polymeric material is a needle-punched polyphenylene sulfide filter media.

33. The filter media pack of claim 29, wherein the filter media has a compressibility of less than 25% at 200 G, where G is defined by the equation $$G = \frac{\omega^2 R}{9.81},$$

where ω is a rotational speed of the filter media pack in radians per second and R is a radius of the filter media pack in meters.

34. The filter media pack of claim 33, wherein the filter media has a compressibility of less than 25% at 1000 G.

35. The filter media pack of claim 29, wherein the fibers are first fibers and the geometric mean fiber diameter is a first geometric mean fiber diameter, wherein the filter media further comprises second fibers having a second geometric mean fiber diameter, the second geometric mean fiber diameter different than the first geometric fiber diameter.

36. The filter media pack of claim 35, wherein the second fibers are layered over the first fibers forming a multi-layer filter media.

37. The filter media pack of claim 35, wherein the second fibers are positioned with respect to the first fibers such that the filter media has a varying filtering efficiency across a length of the filter media thereby forming a gradient efficiency filter media.

38. The filter media pack of claim 35, wherein the filter media is a composite filter media comprising the first fibers and the second fibers.

39. Filter media comprising:
fibers having a geometric mean fiber diameter between 5 to 30 μm, the fibers having a solidity between 5% and 25%, and about three percent of the fibers have a diameter greater than 20 μm,
wherein the filter media has a Frazier permeability of less than or equal to 250 cubic feet per minute at 0.5 inches of water pressure drop.

40. The filter media of claim 39, wherein the filter media has a compressibility of less than 25% at pressures greater than 20 kPa.

41. The filter media of claim 40, wherein the fibers are of a polymeric material.

42. The filter media of claim 41, wherein the filter media is formed into a cylindrical filter media pack.

43. The filter media of claim 42, wherein the filter media has a compressibility of less than 25% at 200 G, where G is defined by the equation $$G = \frac{\omega^2 R}{9.81},$$

where ω is a rotational speed of the filter media pack in radians per second and R is a radius of the filter media pack in meters.

44. The filter media of claim 43, wherein the filter media has a compressibility of less than 25% at 1000 G.

* * * * *